United States Patent Office 3,479,574
Patented Nov. 18, 1969

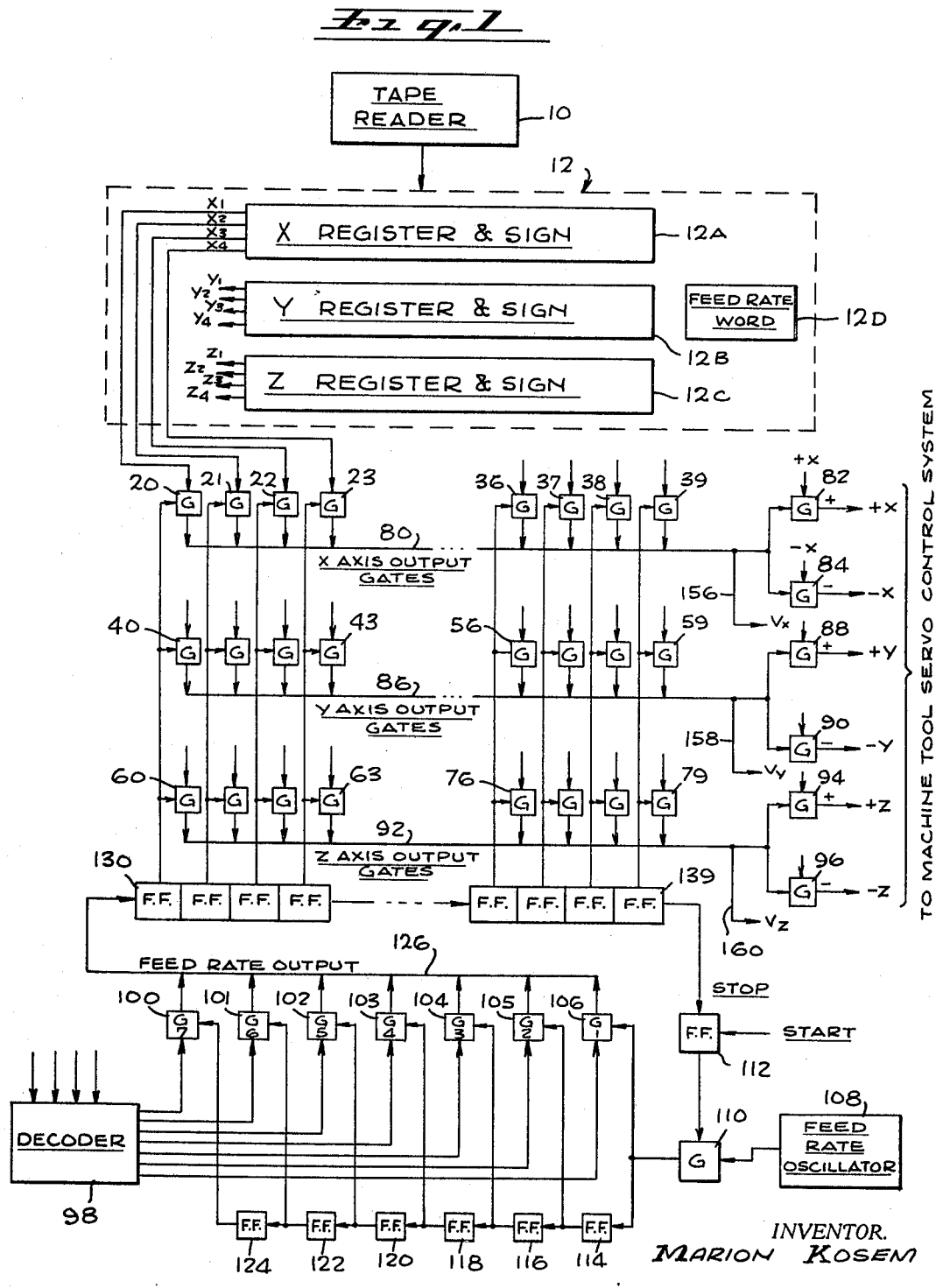

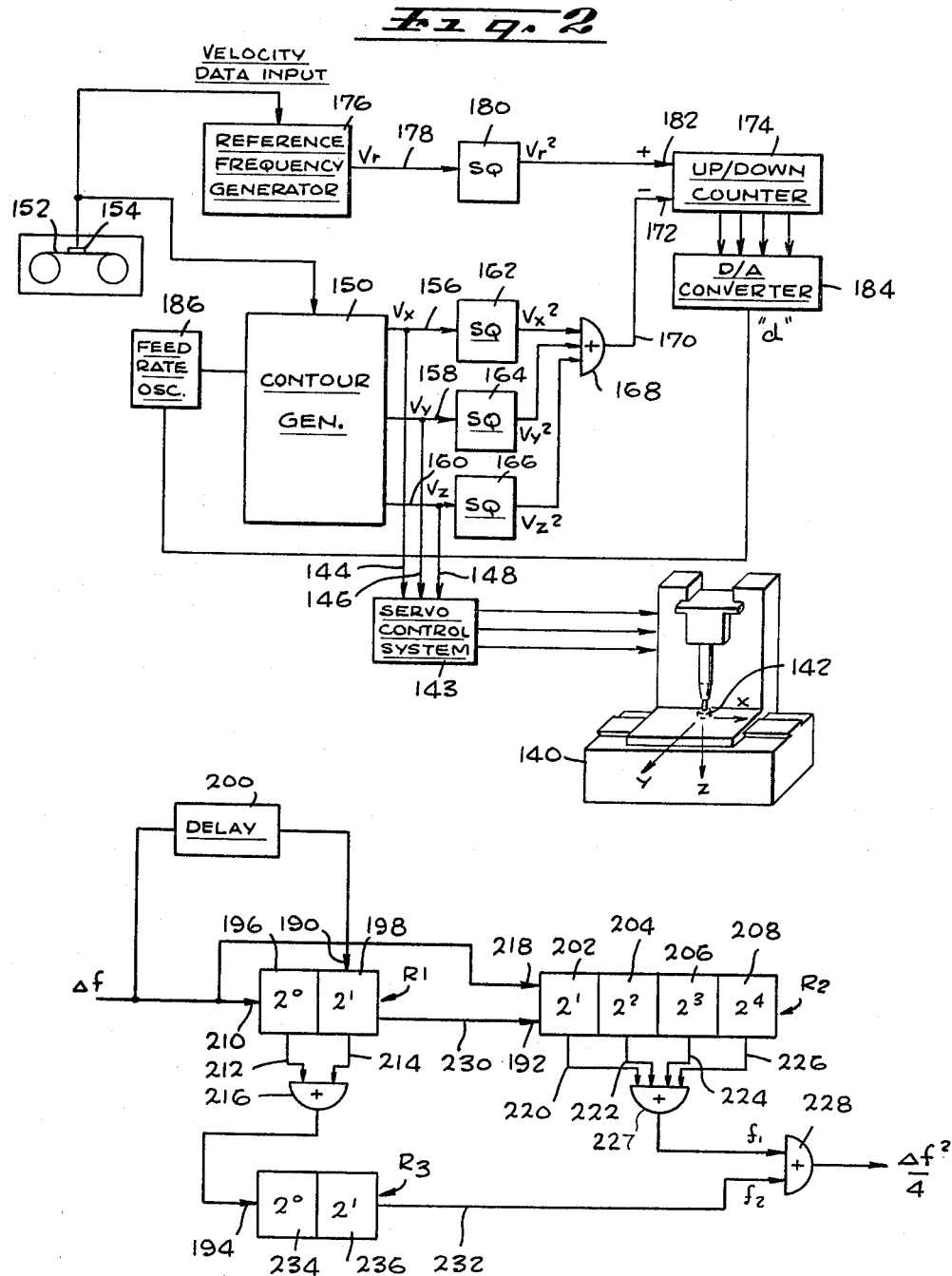

3,479,574
FEED RATE COMPUTER AND SQUARING CIRCUIT FOR A PULSE RESPONSIVE MULTIAXES SERVO SYSTEM
Marion Kosem, Willoughby Hills, Ohio, assignor to The Bunker-Ramo Corporation, Canoga Park, Calif., a corporation of Delaware
Filed Nov. 18, 1966, Ser. No. 595,500
Int. Cl. H02p 7/42; G05b 19/14
U.S. Cl. 318—18
10 Claims

ABSTRACT OF THE DISCLOSURE

In a numerically controlled machine tool, the feed rate number, for each axis which determine the velocity at which a cutting tool is to operate, is recorded on magnetic or punched tape. In accordance with this invention, the velocity ordered by the feed rate number for each axis is carefully monitored and maintained by generating the sum of the squares of the velocities ordered by the feed rate generator of the machine tool for the respective X, Y and Z axes and comparing this number with the square of the velocity generated directly from the feed rate control numbers recorded on the tape. Any difference between these two numbers is used to correct the frequency of oscillation of the feed rate oscillator for the feed rate generator.

---

This invention relates to numerically controlled machine tools and more particularly to apparatus for controlling the feed rate of such tools.

A numerically controlled machine tool of the type presently used usually includes a contour generator having three outputs for producing three trains of pulses, each pulse train advancing a cutting tool or cutter along one of three mutually orthogonal axes. Information on tape is fed into the contour generator and causes the contour generator to deliver a number of pulses over predetermined intervals on one, two, or all three outputs, depending upon the direction and distance over which the cutter is to move during each interval. In order to control the velocity of the tool, a feed rate generator is provided, which also in response to feed rate instructions on tape delivers pulses to the contour generator to govern the rate at which it delivers these pulses to the servo control system of the machine tool. The maintenance of a particular cutting tool speed in response to these pulse trains is desirable and necessary to assure maximum utilization of the machine within its capabilities, to prevent inaccuracies resulting from large accelerations or decelerations in tool speed, and for other reasons.

Accordingly, one object of the present invention is to provide a novel and improved apparatus for controlling the speed of advance of cutting tools in numerically controlled machines.

Another object of the invention is to provide a method for comparing the speed at which a cutting tool is being driven with a reference speed, and altering the cutting tool speed to reduce the difference.

Still another object is to provide a novel and useful feed rate generator for a numerically controlled machine tool.

These and other objects of this invention are realized in one embodiment of the invention which is employed in connection with a tape-fed contour generator for providing three trains of output pulses which command the advance of a cutting tool in three directions, X, Y, and Z. The frequency of each train of pulses is proportional to the velocity of the cutter in the corresponding direction, i.e., $V_x$, $V_y$, and $V_z$. Each of the three pulse trains is delivered to a squaring circuit which provides an output signal of a frequency which is proportional to the square of the frequency of the pulse train inputs to it, i.e., $V_x^2$, $V_y^2$, $V_z^2$. The outputs of the three squaring circuits are delivered to an adder circuit which sums their frequencies. The output of the adder circuit therefore has a frequency proportional to the square of the velocity of the cutting tool, i.e. $V^2$, since the velocity of the tool is equal to $$\sqrt{V_x^2+V_y^2+V_z^2}$$

A reference frequency generator is provided whose frequency is established in response to feed rate instructions read from tape. This frequency is squared and should be equal to the frequency of the adder circuit output when the cutter is moving at the indicated desired speed. If the cutter is moving at less than the desired speed, the adder output frequency will be lower than that of the squared reference frequency. The two frequency signals are delivered to a digital counter which compares them and generates an output in response to which the feed rate oscillator frequency is controlled. The feed rate oscillator determines the rate at which pulses are delivered by the contour generator. Thus the feed rate oscillator frequency is increased if the cutter is moving too slow and decreased if the cutter is moving too fast, until the frequency of the sum of the squares of the contour generator pulse trains equals the reference frequency squared.

The apparatus of the invention provides primarily a digital circuit arrangement, which assures predictable operation and which allows high accuracy.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of a prior art feed rate generator and contour generator explained to assist in an understanding of this invention;

FIG. 2 is a schematic diagram representing an embodiment of the invention; and

FIG. 3 is a block diagram of one embodiment of a squaring circuit for use in the invention.

FIG. 1 is a simplified block diagram of a feed rate generator and contour generator of the type which is shown and described in detail in U.S. Patent No. 3,079,522. FIG. 1, which is illustrated to afford a better understanding and appreciation of this invention, includes a paper tape reader 10 and a main register 12. Information is recorded on the paper tape in blocks, each block representing an X, Y, and Z axis word, associated signs, a feed rate word, and other data, such as tool selection or lubricant control. Information is read a block at a time into the main register 12, which executes the instructions specified by a block and then instructs the tape reader to read the next block of data. The main register 12 will comprise, for example, three registers respectively 12A, 12B, and 12C, each of which has a sufficient capacity to store respectively the X, Y, and Z instruction word and sign indicative of the distance and direction desired along these three axes.

The main register 12 also includes a feed rate register 12D which stores the feed rate instruction word which is read by the tape reader 10 from a block of information on the tape. Each of the many cells in each of the registers 12A–12D stores a binary bit which makes up the binary word stored in each register. Each cell has associated with it a gate which is enabled or not, depending upon whether or not the binary bit is a "one" or a "zero." Thus, by way of example, each one of the cells in the X register (assuming a twenty binary bit word) is connected to each of the twenty X axis gates 20 through 39 to enable them or not to pass pulses received from the feed rate generator. The Y axis gates are respectively indicated by reference numerals 40–59, and Z axis gates bear reference numerals 60–79.

The respective X axis gate outputs are collected on a bus 80 which is connected to two X sign gates respectively, + sign gate 82 and — sign gate 84. The one of these gates which is enabled is determined by the sign bit in the X register. The respective Y axis gate outputs are collected on a bus 86 and are applied to + and — Y axis gates 88, 90. The respective Z axis gate outputs are collected on a bus 92 and applied to + and — Z axis gates 94, 96. The respective Y and Z sign bits in the Y and Z registers determine which of these sign gates is open. The pulse train outputs from the X, Y, and Z sign gates are applied to the machine tool servo system to direct its motion responsive to these pulse trains.

The pulse train inputs to the X, Y, and Z axis gates come from the feed rate generator. This generator determines the velocity of the machine tool motion, and this is determined by the feed rate word. The feed rate word stored in the register 12D is applied to a decoder circuit 98 which converts the feed rate word into a form for controlling the gates 100–106. A feed rate oscillator 108 applies pulses at a suitable frequency to a start gate 110. This gate is controlled by a start flip-flop 112 which is set by a start pulse from a source (not shown) to enable the start gate with its set output.

The gate 110 feeds a chain of flip-flops 114–124 with its outputs. These flip-flops operate as a binary counter and count down pulse trains received from the gate 110. The output from the gate 110 is applied to gate 106. The output from the respective flip-flops 114 through 124 is respectively applied to gates 106 through 100. Thus, assuming the output of the oscillator 108 is 20 kilohertz, flip-flop 124 output is 312.5 Hertz, flip-flop 122 output is 625 Hertz, etc. Therefore, by the selective enablement of the gates 100 through 106 in response to the feed rate word, a predetermined number of pulses per unit of time is collected on a common feed rate bus 126, connected to their outputs. The feed rate bus supplies another frequency divider chain of flip-flops 130 through 139. There is one of these flip-flops for each gate in the Z axis or each gate in the Y axis or X axis. Each of these flip-flops applies its output to a corresponding one of the X, Y, and Z axis gates. The last flip-flop 134 also applies its output to the flip-flop 112 to reset it whereby gate 110 is closed. The next block of data is read into the registers, after which flip-flop 112 is set again.

It should be obvious that the number of pulses collected by the respective X, Y and Z axis busses is determined by the ones of the X axis, Y axis and Z axis gates which are enabled in response to the respective X, Y, and Z axis words. The machine tool velocity is controlled by the feed rate word which determines the rate at which pulses are supplied to the flip-flop chain 130–139 which insures that the same number of pulses per block of information is supplied to the X, Y, and Z axis gates.

The present invention replaces these feed rate generators by the arrangement shown in FIG. 2 which enables the vectorial velocity of the milling machine cutter to be controlled by controlling the frequency of the feed rate oscillator 108, so that it can be varied, for example, from 20 kc. to some other value whenever this is requred. This is a very flexible approach, since the velocity change can be made at any time, even in the midst of a movement defined by one block of tape. The feed rate generator of the present invention provides for such velocity control as well as for the monitoring of cutter speed, i.e., comparing of the actual speed with predetermined desired speed data and variation of the frequency of the reference frequency oscillator to make the actual and desired speeds coincide.

The feed rate generator just described uses a fixed frequency oscillator and selects a feed rate by selectively controlling a plurality of gates with a feed rate word to pass a predetermined number of pulses within a predetermined interval to the contour generator. Other types of feed rate generators may use a combination of the technique described plus that of varying the frequency of the feed rate oscillator. The oscillator frequency is increased where it is merely desired to move the cutting tool to another location without performing a cutting operation. It may also be increased where long cutting paths occur. In both of these instances, the feed rate oscillator frequency is decreased again as it approaches the end of its path.

FIG. 2 is a block diagram of a feed gate generator in accordance with the invention which may be used to control the speed at which a numerically controlled tool machine 140, such as a milling machine, advances its cutting tool 142. The feed rate generator is particularly useful in assuring that the cutting tool advances at a predetermined velocity.

In response to command signals, the machine tool 140 moves in a direction along any axis, or in a combination of three directions, X, Y and Z, in small increments, such as one ten-thousandth of an inch. An incremental advance in any one or combination of three directions X, Y, and Z is made when a pulse signal is applied to the machine tool servo control system 143 over the corresponding lines, such as X input line 144, Y input line 146, and Z input line 148. The pulses are received from a contour generator 150, which generates them in response to information read from a tape 152 by a tape reader 154. The servo control system converts these pulses to phase shift signals which are then used to control cutting tool movement.

The tape reader 154 advances the punched paper tape 152 in steps or blocks, each block defining the distance the tape is to move in the X, Y, and Z directions, the speed or feed rate of such motion, and any other instructions which may be required for the machine tool, as described in connection with FIG. 1.

The X, Y, and Z pulse signals from contour generator 150 which are delivered to lines 144, 146, and 148 leading to the servo control system of the milling machine 140 are also delivered to lines 156, 158, and 160 for processing in accordance with the invention. The rate at which pulses appear on any one of the lines 156, 158, and 160 indicates the velocity of the tool $V_x$, $V_y$, $V_z$ along each of the three directions of movements, X, Y, and Z.

The velocity (which will be used synonymously with speed hereafter) of the tool in the resulting direction of its movement is equal to $\sqrt{V_x^2+V_y^2+V_z^2}$, where $V_x$, $V_y$, and $V_z$ denote velocity in each of the directions X, Y, and Z, respectively. To obtain $(V_x^2+V_y^2+V_z^2)$, the output lines 156, 158, and 160 are connected to respective squaring circuits 162, 164, and 166. Each squaring circuit delivers an output signal having a frequency (or repetition rate) proportional to the square of the frequency (or repetition rate) of the input signal. The respective outputs of the squaring circuits are delivered to an "or" gate circuit 168.

The output of "or" gate circuit 168 is a train of pulses whose average repetition rate is proportional to the square of the total velocity of the tool. This output is delivered over line 170 to the minus input 172 of an up/down counter 174. The circuitry of such a counter, also known as a "reversible counter" is well known in the art and thus need not be described here.

A reference frequency generator 176 is provided which, in response to its input from the tape reader, generates a train of pulses $V_r$ and supplies them to output line 178. The repetition rate of this pulse train is proportional to the reference velocity, i.e., the velocity at which it is desired to advance the cutter 142. The reference frequency generator may be a velocity word controlled pulse train generating system, which in its complex form may be a feed rate pulse train generating system as shown in FIG. 1, or may be a voltage controlled oscillator controlled by an analog voltage derived from a digital word read from the tape. The velocity signal $V_r$ is processed through squaring current 180 which yields $V_r^2$. This signal $V_r^2$ is delivered to the + input 182 of the up/down counter 174.

The up/down counter 174 counts up by one when a pulse is received on + input 182 and counts down by one when a pulse is received on − input 172. The net count of the counter is continuously delivered in binary digit form to a digital-to-analog converter 184. The converter 184 delivers an analog voltage "$d$," which is representative of its digital input, to a feed rate oscillator 186. The feed rate oscillator, which may be any of the well known types of voltage controlled oscillators, delivers an output pulse train to the contour generator, which has a frequency which changes with changes in the voltage input "$d$." The output pulse train of the feed rate oscillator to the contour generator governs the rate at which command pulses are delivered to the milling machine, as previously described. In FIG. 1 this feed rate oscillator output would be applied to bus 126. Lines 156, 158, and 160 are shown in FIG. 1.

The circuit just described enables the rate of advance of the cutter 142 to be maintained close to a desired velocity, as determined by the velocity data input from the tape reader to the reference frequency generator 176, as will now be explained. The output of "or" circuit 168 is a pulse train having a repetition rate proportional to the square of the actual cutter velocity. If this rate is equal to the square of the desired velocity, given by the output $V_r^2$ of the reference frequency generator 176, then the count on counter 174 will not change. There will always be a finite count output applied to the digital-to-analog converter because a definite voltage "$d$" is required to set the feed rate oscillator 186 at a rate which will cause the velocity to be maintained at the desired level. In fact, a higher desired velocity generally necessitates a high required voltage "$d$," since a higher velocity generally necessitates a higher frequency input to the contour generator 150 to move the machine tool cutter faster. It should be noted that simultaneous tool movement in three directions produces a velocity $\sqrt{3}$ times as great as movement in one direction, for a given tape speed, so a higher velocity does not necessarily require a higher voltage "$d$," although it generally does.

While the feed rate computer has been shown in a system which has three directions of travel, X, Y, and Z, some simpler machines utilize only two axes of movement. In those cases, only two outputs $V_x$ and $V_y$ would be squared and added. Some other machines utilize additional modes of movement, such as a rotational movement, and such other movements can be accounted for by adding in the velocity contributions of the movement. For example, rotation about the Z axis in the milling machine of FIG. 2 results in a change in $V_x$ and $V_y$ and, by making corrections to X and Y before the pulses enter the squaring circuits, the velocity can still be regulated.

In accordance with the invention, the feed rate oscillator 186 shown in FIG. 2 is used to replace the feed rate oscillator 108 in FIG. 1 and its following flip-flops and gates, and its output is fed directly to the line 126 connected to the flip-flop 130.

One embodiment of a squaring circuit suitable for use in this invention is shown in detail in FIG. 3. The input $\Delta f$ to the circuit represents a pulse ($V_x$ or $V_y$ or $V_z$) from the contour generator 150. The output $\Delta f^2/4$ of the circuit of FIG. 2 has a repetition rate of one-fourth the square of the input repetition rate. Any other proportion can be used as long as the same proportion is used for all squaring circuits. The squaring circuit of FIG. 3 essentially counts the number of input pulses $\Delta f$ up to a maximum of 32 pulses, and delivers an output $\Delta f^2/4$ equal to one-fourth the square of the number of input pulses. At regular intervals the circuit count is reduced to zero, and another count of up to 32 is begun. The intervals are brief enough so that even at the fastest velocity of the cutting tool no more that 32 pulses will be received during an interval. The circuit illustrated in FIG. 3 does not deliver a group of pulses equal to $\Delta f^2/4$ at the end of the interval, but instead the total number of pulses at any instant during the interval is equal to one-fourth the square of the number of pulses received during the interval up to that instant. While the circuit of FIG. 3 does not provide an exact $\Delta f^2/4$ output for an input $\Delta f$, it provides a very close approximation.

The squaring circuit of FIG. 3 includes two combination counter and rate multipliers $R_1$ and $R_2$ and a counter $R_3$. All of the circuits $R_1$, $R_2$, and $R_3$ store, or count, pulses delivered on their add inputs 190, 192, and 194, respectively.

The circuit $R_1$ has two cells 196 and 198 for counting up to 3 in binary form, cell 196 representing the $2^0$ digit and cell 198 representing the $2^1$ digit. Cell 196 is always left in a "1" state, so the entire circuit $R_1$ can have only a 1 or 3 state. Cell 198 changes from 0 to 1 or from 1 to 0 each time a pulse is received at add input 190, thereby causing the entire circuit $R_1$ to change from 1 to 3 and then back to 1. The add input 190 is received from a delay line 200 immediately after a pulse $\Delta f$ is delivered to the squaring circuit (or arrangements can be made to deliver the add input directly from the contour generator).

Circuit $R_2$ has four cascaded flip-flop cells 202, 204, 206, and 208 for counting to 15 in binary form. Each time a pulse is received at add input 192, the cell 202 changes state from 0 to 1 or back from 1 to 0. Each time a cell changes from 1 to 0, the next cell changes state. In this way, $R_2$ can count to 15 when fifteen pulses have been received at input 192.

The circuit $R_1$ has a trigger input 210 and two outputs 212 and 214. When a $\Delta f$ pulse is received at trigger input 210, signals representing the number stored in $R_1$ are delivered to outputs 212 and 214. Cell 196 is always "1" so one pulse is always delivered from that cell when $R_1$ is triggered. Cell 198 delivers two pulses to output 214 if it is in a "1" state and no pulses if it is in a "0" state when $R_1$ is triggered. The two outputs 212 and 214 are connected to an "or" gate 216, which passes them to add input 194 of $R_3$. All pulses from cells 196 and 198 do not simultaneously arrive at "or" gate 100, since the contour generator from which these pulses are supplied includes a binary rate multiplier which delivers pulses non-coincidentally which are gated by cells 196 and 198.

The circuit $R_2$ has a trigger input 218 and four trigger outputs 220, 222, 224, and 226. When a $\Delta f$ pulse is received at trigger input 218, the number stored in $R_2$ is delivered to its output in a manner similar to that for $R_1$. If any of cells 202, 204, 206, or 208 is in a "1" state, it delivers one, two, four, or eight pulses, respectively, when the circuit is triggered. Otherwise it delivers no pulse. The outputs are delivered to an "or" gate 227 whose output is connected to an "or" gate 228.

The circuits $R_1$ and $R_3$ each have overflow outputs respectively 230, 232 connected to their highest order cells respectively 198 and 236. Whenever cell 198 or 236 changes from the "1" to the "0" state, a pulse is transmitted to the overflow output 230 or 232. The overflow output 230 is the add input of $R_2$, while the overflow output 232 is delivered to the final "or" circuit 228. The two inputs to "or" circuit 228 are labeled $f_1$ and $f_2$, respectively.

The output of the squaring circuit of FIG. 3 for an input $\Delta f$ is approximately $\Delta f^2/4$. The state of the circuit at each pulse $\Delta f$ is given by the table reproduced below which shows the circuit states for input pulses $\Delta f$ of from 1 through 20 of the total possible 32 pulses. In the table, column "$\Delta f$" shows the number of the pulses delivered to the circuit from the time it was last cleared; the columns "$R_1$," "$R_2$," and "$R_3$" denote the counting state of the respective circuits immediately after receipt of the $\Delta f$ pulse whose number is given on the same row (but before the pulse from delay line 73 is received); the columns "$f_1$" and "$f_2$" represent the number of pulses that are delivered over those lines (indicated at 114 and 120 in FIG. 2) immediately after the $\Delta f$ pulse; the column "Accum. Sum" represents the total number of pulses delivered from the "or" gate 228 from the time the squaring circuit was last cleared; and the column "Perfect $f^2/r$" represents the number of accumulated pulses required to equal precisely one-fourth the square of the number of input pulses. It can be seen from comparing "Accum. Sum" with "Perfect $f^2/4$" that the percent deviation becomes small for cases where more than a few pulses are delivered during the intervals between clearing of the squaring circuit.

ance with this invention which are illustrated in FIG. 2 are known to the art and are not shown in detail. It may be noted from the foregoing that the embodiment of the feed rate computer described above operates primarily with digital circuits. This allows for highly predictable results in spite of slight changes in the parameters of some circuit components, and also allows for high accuracy. The feed rate computer may, however, be used in even a completely analog form.

While a particular embodiment of the invention has been described in detail, many variations and modifications will occur to those skilled in the art. Accordingly, the invention is not limited by the particular embodiment described herein, but only by a just interpretation of the following claims.

The embodiments of the invention in which an exclusive property or privilege is claimed are defined as follows:

1. A method for controlling the velocity of a machine

TABLE

| Input | $R_1$ | $R_2$ | $R_3$ | $f_1$ | $f_2$ | Output $\Delta f^2/4$ | Accum. Sum | Perfect $f^2/4$ |
|---|---|---|---|---|---|---|---|---|
| 1 | 1 | 0 | 1 | | | | 0 | .25 |
| 2 | 3 | 0 | 0 | 1 | | 1 | 1 | 1 |
| 3 | 1 | 1 | 1 | | 1 | 1 | 2 | 2.25 |
| 4 | 3 | 1 | 0 | 1 | 1 | 2 | 4 | 4 |
| 5 | 1 | 2 | 1 | | 2 | 2 | 6 | 6.25 |
| 6 | 3 | 2 | 0 | 1 | 2 | 3 | 9 | 9 |
| 7 | 1 | 3 | 1 | | 3 | 3 | 12 | 12.25 |
| 8 | 3 | 3 | 0 | 1 | 3 | 4 | 16 | 16 |
| 9 | 1 | 4 | 1 | | 4 | 4 | 20 | 20.25 |
| 10 | 3 | 4 | 0 | 1 | 4 | 5 | 25 | 25 |
| 11 | 1 | 5 | 1 | | 5 | 5 | 30 | 30.25 |
| 12 | 3 | 5 | 0 | 1 | 5 | 6 | 36 | 36 |
| 13 | 1 | 6 | 1 | | 6 | 6 | 42 | 42.25 |
| 14 | 3 | 6 | 0 | 1 | 6 | 7 | 49 | 49 |
| 15 | 1 | 7 | 1 | | 7 | 7 | 56 | 56.25 |
| 16 | 3 | 7 | 0 | 1 | 7 | 8 | 64 | 64 |
| 17 | 1 | 8 | 1 | | 8 | 8 | 72 | 72.25 |
| 18 | 3 | 8 | 0 | 1 | 8 | 9 | 81 | 81 |
| 19 | 1 | 9 | 1 | | 9 | 9 | 90 | 90.25 |
| 20 | 3 | 9 | 0 | 1 | 9 | 10 | 100 | 100 |
| 21-32 | | | | | | | | |

A better understanding of the squaring circuit can be obtained by considering the circuit states for the first few pulses $\Delta f$. Initially all circuits $R_1$, $R_2$, and $R_3$ are cleared, except that cell 198 of $R_1$ is always a "1." The clearing is accomplished by sending reset pulses over reset lines (not shown) which turn all cells (except cell 196) to a "0" state. On receipt of the first $\Delta f$ pulse, cell 196 of $R_1$ delivers one pulse to $R_3$ which registers a "1." Before the second $\Delta f$ pulse, a pulse is added at 190 to change cell 198 to a "1" state and thereby change $R_1$ to a 3 count.

Upon receipt of the second $\Delta f$ pulse, $R_1$ delivers a pulse at output 212 and two pulses at output 214, thereby delivering three pulses to $R_3$. $R_3$ overflows and returns to a zero count, and it also delivers one pulse to final "or" gate 228 and thus provides one output pulse. The immediately following pulse from delay line 200 changes $R_1$ from a 3 to a 1 count, thereby producing an overflow from $R_1$ which places $R_2$ in its 1 count.

Upon receipt of the third $\Delta f$ pulse, $R_1$, which has a 1 count, delivers one pulse to $R_3$ to raise it to a 1 count. The $\Delta f$ pulse to $R_2$, which is now in a 1 state, causes $R_2$ to deliver one pulse to the output of the circuit. Thus, two pulses have been delivered by the squaring circuit. The pulse from delay line 200 to cell 198 raises $R_1$ to a 3 count.

The fourth pulse $\Delta f$ causes $R_1$ to turn $R_3$ to 0, and $R_3$ produces an overflow output which contributes one more output pulse of the squaring circuit. Also, $R_2$, having a 1 count, contributes one additional pulse to the squaring circuit output, which now stands at a cumulative total of 4. Occurrences of the type described happen in response to the continuation input pulses, and the states of the circuit elements for up to 20 pulses can be traced in the table. The state of the circuit elements from 20 to 32 pulses can be derived using the delineated procedure.

The other circuits of the feed rate computer in accordwhich moves in at least two orthogonal directions and whose movement in each of said directions is made in incremental steps, a step in either direction being made in response to a pulse being received to command motion in that direction, comprising:

generating first signals having values proportional to the square of the pulse rates for each commanded direction of movement of said machine;

summing the value of said signals to obtain a second signal having a value proportional to the sum of the square of the pulse rates;

generating a third signal having values proportional to the square of the pulse rates for the desired total velocity;

comparing said second and third signals and generating a fourth signal having a value proportional to the difference between the squares of velocity indicated by said second and third signals; and varying the rate at which pulses are delivered to said machine, in accordance with the value of said fourth signal.

2. A method as defined in claim 1 wherein;

the values of said first, second and third signals are pulse repetition rates thereof, and said step of comparing comprises subtracting the numbers of pulses on said third signal from the number of pulses on said second signal.

3. A method as defined in claim 1 wherein:

said step of varying the rate at which pulses are delivered includes varying the frequency of an oscillator which controls the rate at which pulses are delivered to said machine.

4. Apparatus for controlling the velocity of a machine, comprising:

contour generator means for providing a plurality of outputs representing a plurality of directions of movement of said machine, each output providing a pulse for each incremental movement in the direction associated with said output;

a squaring circuit means connected to each of said outputs of said contour generator means for providing an output having a number of pulses proportional to the square of the number of inputs to the squaring circuit means;

summing means connected to said outputs of said squaring circuit means for providing an output having a number of pulses proportional to the sum of the pulses from all of said squaring circuit means;

reference generator means for providing a train of pulses having a predetermined repetition rate to represent a desired velocity for said machine;

means for squaring the output of said reference generator means;

reversible counter means connected to said means for squaring and said summing means for providing an output proportional to the difference between the square of the velocity of said machine as indicated by the number of pulses from said summing means and the square of the desired velocity of said machine as indicated by the square of the number of pulses from said reference generator means; and means for varying the rate at which said contour generator means provides pulses for incremental movement of said machine in accordance with the output from said reversible counter means.

5. Apparatus as defined in claim 4 wherein:

said means for varying the rate at which said contour generator means provides pulses is a variable frequency oscillator, and means are provided for controlling the frequency of said variable frequency oscillator responsive to the output of said reversible counter.

6. In a numerically controlled machine tool which includes a contour generator for generating in response to feed rate and axis control information first and second pulses on its respective output terminals to control the motion of a machine tool in incremental movements in first and second directions, the improvement comprising:

first and second means for providing outputs proportional to the square of inputs thereto, each said first and second means having input terminals respectively connected to one of said contour generator output terminals;

summing means connected to the outputs of said first and second means for summing their outputs;

reference frequency means for generating in response to said feed rate information an output indicative of the square of a velocity specified by said information;

comparing means connected to said summing means and said reference frequency means outputs for generating an output indicative of the difference between the outputs of said summing means and said reference frequency means;

a signal controlled feed rate oscillator means having an output connected to said contour generator for controlling the rate at which pulses are delivered to said contour generator for controlling the rate of motion of said machine tool; and means for applying said comparing means output to said oscillator means to control the frequency of the output of said oscillator means therewith to vary the rate of pulse output of said contour generator in a manner to reduce the difference between said desired velocity and the actual velocity of said tool.

7. The improvement defined in claim 6 wherein:

each of said first and second means repeatedly samples the output from an output terminal of said contour generator during predetermined intervals of time, and generates a number of output pulses substantially proportional to the square of the number of received pulses.

8. The improvement defined in claim 6 wherein:

said contour generator provides outputs in the form of distinct pulses;

said first and second means provide outputs in the form of distinct pulses, the number of pulses during predetermined intervals being proportional to the square of the number of input pulses thereto during an equal interval;

said summing means is an "or" circuit means for providing an output including a number of pulses equal to the number of input pulses received on its inputs;

said reference frequency means provides pulses at a rate equal to the rate of pulses issuing from said summing means when said machine tool is moving at said desired total velocity; and said comparing means is an up/down counter for providing an output proportional to the difference between the number of pulses received from said summing means and from said reference frequency means.

9. A squaring function generator for providing a number of output pulses approximately proportionate to the square of the number of input pulses, comprising:

a first combination counter and rate multiplier circuit having a first binary cell always set to a binary "1" and a second binary cell, said first cell having a trigger output providing one pulse and said second cell having a trigger output providing no pulses when the cell is in a "zero" state and two pulses when the cell is in a "one" state when said circuit is triggered.

a trigger input to said first circuit for causing the delivery of said outputs from said trigger outputs of said first and second cells;

add means connected to said second cell of said first circuit for changing the binary state of said cell after each trigger input to said first circuit;

an overflow output for said first circuit for providing a pulse when the last ordered cell of said first circuit changes from a binary "one" state to a "zero" state;

a second combination counter and rate multiplier circuit having a plurality of binary cells arranged in cascaded counting order for binary counting wherein each cell changes state when the preceding cell changes from a binary "one" to a binary "zero" state, each of said cells having a trigger output providing no pulses when the cell is in a "zero" state and a number of pulses dependent upon the counting order of the cell when it is in a "one" state, when said second circuit is triggered;

a trigger input to said second circuit for triggering said circuit when said first circuit is triggered;

an input terminal connected between said overflow output of said first circuit and an add input to said first cell of said second circuit;

a third counter circuit having at least one binary cell arranged in counting order, said third circuit having an add input for receiving the pulses from the trigger outputs of said first circuit, and said third circuit having an overflow output for providing a pulse when the last counting cell thereof changes from a binary "one" to a "zero"; and "or" circuit means connected to said trigger outputs of the cells of said second circuit and to said overflow output of said third circuit, for adding all of the pulses delivered therefrom.

10. A squaring function generator as defined in claim 9, wherein:

said first circuit has two cells, said second circuit has four cells, and said third circuit has two cells, whereby to enable an output containing a number of pulses proportional to the square of the number of input pulses up to 32 input pulses.

References Cited

UNITED STATES PATENTS 2,927,735   3/1960   Scuitto.
3,286,085   11/1966  Rado.

ORIS L. RADER, Primary Examiner
THOMAS E. LYNCH, Assistant Examiner

U.S. Cl. X.R.

235—151.11; 318—162